United States Patent
Uziel et al.

(10) Patent No.: US 8,947,995 B2
(45) Date of Patent: Feb. 3, 2015

(54) DYNAMIC PACKET SCHEDULING METHOD, APPARATUS AND COMPUTER PROGRAM

(75) Inventors: Lior Uziel, Hod Hasharon (IL); Inbar Anson Bratspiess, Tel Aviv (IL)

(73) Assignee: Sequans Communications, Colombes (FR)

(*) Notice: Subject to any disclaimer, the term of this patent is extended or adjusted under 35 U.S.C. 154(b) by 389 days.

(21) Appl. No.: 13/307,643

(22) Filed: Nov. 30, 2011

(65) Prior Publication Data

US 2012/0163251 A1    Jun. 28, 2012

(30) Foreign Application Priority Data

Nov. 30, 2010   (EP) .................................. 10193203

(51) Int. Cl.
| | |
|---|---|
| H04J 11/00 | (2006.01) |
| H04W 72/12 | (2009.01) |
| H04W 16/12 | (2009.01) |

(52) U.S. Cl.
CPC .......... H04W 72/1226 (2013.01); H04W 16/12 (2013.01)
USPC .......................................... 370/208; 370/280

(58) Field of Classification Search
None
See application file for complete search history.

(56) References Cited

U.S. PATENT DOCUMENTS

| | | | |
|---|---|---|---|
| 5,170,413 A | 12/1992 | Hess et al. | |
| 5,455,821 A | 10/1995 | Schaeffer et al. | |
| 6,128,497 A | 10/2000 | Faruque | |
| 6,542,746 B1 | 4/2003 | Dean | |
| 6,597,748 B1 | 7/2003 | Hietala et al. | |
| 7,574,179 B2* | 8/2009 | Barak et al. | 455/101 |
| 7,593,729 B2 | 9/2009 | Barak et al. | |
| 7,756,519 B2 | 7/2010 | Barak et al. | |
| 2007/0081449 A1 | 4/2007 | Khan | |
| 2007/0177501 A1 | 8/2007 | Papasakellariou et al. | |
| 2007/0178930 A1 | 8/2007 | Xiao et al. | |
| 2007/0218904 A1 | 9/2007 | Park et al. | |
| 2007/0293229 A1 | 12/2007 | Khan | |
| 2009/0061778 A1 | 3/2009 | Vrzic et al. | |
| 2009/0069043 A1 | 3/2009 | Roh et al. | |
| 2009/0225714 A1 | 9/2009 | Kim et al. | |
| 2009/0279478 A1 | 11/2009 | Nagaraj et al. | |
| 2009/0291691 A1* | 11/2009 | Jeong et al. | 455/450 |
| 2010/0075687 A1 | 3/2010 | Chayat | |
| 2010/0248728 A1 | 9/2010 | Sun et al. | |
| 2010/0267338 A1 | 10/2010 | Chiu et al. | |

FOREIGN PATENT DOCUMENTS

WO    2010025953 A1    3/2010

OTHER PUBLICATIONS

European Search Report Dated Apr. 26, 2011 for Corresponding Application No. 10193203.6, Filed Dec. 22, 2010.

* cited by examiner

*Primary Examiner* — Andrew Lai
*Assistant Examiner* — Leon Andrews
(74) *Attorney, Agent, or Firm* — David D. Brush; Westman, Champlin & Koehler, P.A.

(57) ABSTRACT

A method and a system for the fractional reuse of frequencies in a wireless network. The method includes the following steps: obtaining at least one PHY based index defining a preferred allocation of a mobile station among at least two frequency reuse zones in a cell of said communication network; and scheduling bursts of packets to transmit to the mobile station, by at least one frequency reuse zone among the at least two frequency reuse zones, in view of transmission requests and the at least one PHY based index.

10 Claims, 5 Drawing Sheets

DYNAMIC PACKET SCHEDULING METHOD, APPARATUS AND COMPUTER PROGRAM

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to the field of wireless communications and more particularly to a method and system for the fractional reuse of frequencies in a manner that adapts to features linked to mobile stations and current transmission channel. The disclosure is more specifically applied in a cellular OFDMA-TDD network.

Wireless communication networks, such as cellular networks, operate by sharing resources among the mobile stations operating in the communication network. As part of the sharing process, resources relating to which channels, codes, etc., are managed by at least one controlling equipment within the communication network. Certain types of wireless communication networks, e.g., orthogonal frequency division multiplexed ("OFDM") networks, are used to support cell-based high speed services such as those under the IEEE 802.16 standards (WiMAX for example).

BACKGROUND OF THE DISCLOSURE

OFDM technology uses an approach based on the division of a wireless communication channel into several sub-channels which can be used by multiple mobile stations at the same time. These sub-channels and the mobile stations are often subject to interference coming from neighbouring cells which are adjacent to the current cell to which a mobile station is connected. This occurs because neighbouring base stations can use the same frequency blocks that the ones used by the base station to which the mobile station is connected.

Thus, methods were proposed for adapting the output power of the base stations to a value which enables mobile stations at the cell edge to still transmit and receive data at quite a good rate while not creating too much interference in neighbouring cells. One of these methods, described below, has been proposed to reduce interference caused by neighbouring base stations using the same frequency blocks and thereby help to increase mobile station throughput and overall network capacity.

For distant mobile stations, (i.e., mobile stations at the edge of a cell), a base station has to use more transmission power in order to reach them. Mobile stations close to the base station require much less transmission power to receive the signal. Because known mobile stations only transmit and receive on some but not all sub-channels of the frequency band, transmission power of sub-channels used by mobile stations close to a base station can be lower than the transmission power of sub-channels used by mobile stations at the cell edge. In practice, the reduced transmission power for sub-channels used by mobile stations close to a base station creates less interference for mobile stations close to other base stations.

To further minimize interference of high power sub-channels for clients of neighbouring base stations, the cells are also organized in a way that two adjacent cells do not use the same high power sub-channels: the cells are thus divided in sectors (basically 3). As such, cell edge mobile stations can be scheduled on the high power tones that are not used or are used with lower transmit power by the neighbouring sectors of the neighbouring cells. This method is known as fractional frequency re-use ("FFR"). All base stations use the same frequency band with different power level restriction on different sub-channels. Some frequencies are used by all the sectors and thus have a reuse factor of one, whereas, other frequencies may only be used by a third of the sectors and thus have a reuse factor of ⅓.

FIG. 1 is an example of a cellular network CN with 3 cells (C1, C2, C3), each of them implementing the FFR method. FIG. 1 shows the cell edge as the "white" area, where the fractional frequency-reuse is more beneficial (only one frequency is used, for example F1): the "payment" of lost resources (for example F2+F3 in cell C1) is worth the reduction of the inter cell interference; The "grey" area utilizes the full bandwidth (i.e. all the frequencies F1+F2+F3), where the penalty of lower transmission rates is worth the excess bandwidth made available.

An obvious drawback of this FFR method is to reduce throughput capacity (just ⅓ of the normal capacity). Therefore, in order to overcome this drawback, FFR is used in conjunction with Full-PUSC on the same DL sub-frame, i.e. the data section of the DL sub-frame is divided into two independent zones (3 zones altogether, including the mandatory non STC ⅓ PUSC zone) as shown in FIG. 2 (which shows an example of a WIMAX TDD frame partitioned into zones on the DL: the partial reuse zone is the 1st and the full bandwidth reuse zone is the 2nd). PUSC is for "Partial use of sub-carriers". PUSC method is for designating a method for creating sub-frequency channels, at the MAC level of the WiMAX standard. Beginning of each frame contains a UL-MAP and DL-MAP that indicate when and on what frequency the station can transmit (basic set of slots). These slots are placed in different sub-frequency channels, and when using a PUSC permutation, only a portion of the frequency band is used.

In other words, the common technique is to divide the data section of the DL sub-frame into two independent zones (altogether 3 zones including the mandatory non STC ⅓ PUSC zone).

Considering such a split of the DL sub-frame, the standard algorithm allocates mobile stations with high inter cell interference to the FFR zone and mobile stations with low inter cell interference to the full bandwidth zone. The standard algorithm calculates an index: the ratio between the value of allocating in the full reuse zone and the value of allocating in the fractional reuse zone. The ratio is compared to a threshold (typically 1) and mobile stations are allocated to the best zone, accordingly. The value is mainly an issue of the physical (PHY) layer.

In a TDD system, the fractional frequency reuse zone length must be shared by all the cells in the network and is therefore externally configured and can't be changed dynamically according to a specific cell's traffic pattern.

Considering the above observations, one of the main problems that might arise from the FFR concept is throughput reduction and scheduler inefficiency. Although mobile station assignment is dynamic over time, it doesn't take into account traffic request criteria, and thus it is expected that in many cases the inefficiency in the scheduling algorithm shall be quite high.

The inefficiency is evident when one of the zones (full or fractional reuse zone) is fully booked, while the other is not; DL packets that could have been transmitted during this frame are withheld since they were allocated to the full zone, and will not be transmitted in the partially empty zone.

Therefore, the algorithm must take into account the zone utilization when allocating mobile stations, in order to utilize both zones as much as possible. This is mainly an issue of MAC layer.

SUMMARY

An exemplary embodiment of the invention does not have these drawbacks of the prior art solution. An embodiment of the invention fixes the throughput reduction and the scheduling inefficiency by combining the use of PHY layer and MAC layer values. More specifically, the dynamic scheduling method uses cross layer information:
- PHY layer: using PHY based statistics to devise a PHY based index indicating the ratio between the value of allocating the MS traffic in each reuse zone (full vs. partial). It is the optimum allocation solution from a single mobile station's perspective.
- MAC layer: based on QoS requirements, the method tracks the frame scheduling process, and dynamically changes burst allocations to zones (as opposed to mobile station allocations to zones), optimizing zone utilization from the whole cell's perspective, while maintaining maximal possible mobile station efficiency.

In accordance with one aspect, an embodiment of the present invention provides a dynamic packet scheduling method in a cellular OFDMA-TDD network. According to an embodiment of the invention said dynamic packet scheduling method comprises the following steps:

In accordance with one aspect, an embodiment of the present invention provides a dynamic packet scheduling method in a cellular OFDMA-TDD network. According to an embodiment of the invention, said dynamic packet scheduling method comprises the following steps:
- obtaining at least one PHY based index defining a preferred allocation of a mobile station among at least two frequency reuse zone (Zr1, Zr3) in a cell of said communication network;
- scheduling bursts of packets to transmit to said mobile station, by means of at least one frequency reuse zone among the at least two frequency reuse zone, in view of transmission requests and said at least one PHY based index.

Thus an embodiment of the invention allows selecting one or more frequency reuse zone not only in view of PHY layer consideration. Indeed, current transmission requests are also considered for evaluating the expedience of transmitting a burst by means of at least one frequency reuse zone among the available zones, almost regardless a preferred frequency reuse zone for the mobile station.

More particularly, said scheduling step comprises, for every incoming transmission request:
- a step of calculating the number of slots that are needed to fulfil said request in said at least two frequency reuse zones, using the appropriate modulation and coding scheme (MCS) in each zone;
- a step of inserting at least one parameter of said request in a zone allocation data structure, when said needed number of slots in each zone is less than the remaining number of slot in that zone;
- a step of freeing at least one slot in at least one zone, when said needed number of slots in one of said zone is greater than the remaining number of slot in that zone.

Thus, it is possible to allocate dynamically bursts of packets to transmit to one or more zone in view of the maintained number of free slots for each zone. The management of the slots is thus easy and does not lead to an important increase of the complexity of the scheduler.

More particularly, said zone allocation data structure comprises, for a current incoming transmission request:
- a field that points to an appropriate data chunk descriptor associated to said request;
- a field, comprising said PHY based index, that represents zone selection recommendation;
- a field comprising said number of required slots in said first frequency reuse zone (R1_Zone);
- a field comprising said number of required slots in said second frequency reuse zone (R3_Zone).

More particularly, said step of freeing at least one slot comprises, when slots have to be freed in a first reuse zone (R1_Zone):
- at least one step of freeing, in said zone allocation data structure, from the lowest value of said PHY based index to the highest value of said PHY based index, entries of said zone allocation data structure that have a double zone allocation;
- at least one step of updating said remaining number of slot in said first reuse zone.

More particularly, said step of freeing at least one slot comprises, when slots have to be freed in a second reuse zone (R3_Zone):
- at least one step of freeing, in said zone allocation data structure, from the highest value of said PHY based index to the lowest value of said PHY based index, entries of said zone allocation data structure that have a double zone allocation;
- at least one step of updating said remaining number of slot in said second reuse zone.

More particularly, said step of obtaining at least one PHY based index comprise a step of calculating a ratio between a first value of allocating said mobile station to a first frequency reuse zone and a second value of allocating said mobile station to a second frequency reuse zone;

In a specific embodiment, said first value of allocating said mobile station to a first frequency reuse zone is obtained by multiplying efficiency (bits/symbol), by channel resources both applied to said first frequency reuse zone.

In a specific embodiment, said second value of allocating said mobile station to a second frequency reuse zone is obtained by multiplying efficiency (bits/symbol), by channel resources both applied to said second frequency reuse zone.

In a specific embodiment, the invention also relates to a dynamic packet scheduling apparatus in a cellular OFDMA-TDD network.

According to the disclosure, said dynamic packet scheduling apparatus comprises means for:
- obtaining at least one PHY based index defining a preferred allocation of a mobile station among at least two frequency reuse zone (Zr1, Zr3) in a cell of said communication network;
- scheduling bursts of packets to transmit to said mobile station, by means of at least one frequency reuse zone among the at least two frequency reuse zone, in view of transmission requests and said at least one PHY based index.

In another embodiment, the disclosure also relates to a computer program product downloadable from a communications network and/or stored on a computer-readable support and/or executable by a microprocessor. According to the disclosure, said computer program product comprising program code instructions for:

obtaining at least one PHY based index defining a preferred allocation of a mobile station among at least two frequency reuse zone (Zr1, Zr3) in a cell of said communication network;

scheduling bursts of packets to transmit to said mobile station, by means of at least one frequency reuse zone among the at least two frequency reuse zone, in view of transmission requests and said at least one PHY based index.

BRIEF DESCRIPTION OF THE DRAWINGS

The proposed method is described in the following by way of examples in connection with the accompanying figures without limiting the scope of the protection as defined by the claim. The figures show:

DETAILED DESCRIPTION OF ILLUSTRATIVE EMBODIMENTS

1. Main Features of an Embodiment of the Invention

This embodiment comprises two distinct parts: the first part relates to the calculation of a "PHY based index" for estimating the value of allocating a mobile station to a full or partial resource zone; and the second part relates to dynamically allocate of bursts to one of the zones (Reuse-1 and Reuse-3 zones for an example of two zones) depending on MAC based statistics for zone utilization in view of this "PHY based index" and other current parameters (i.e. for example scheduling constraints in the different zones). Thus, the allocation of bursts is not only done in view of a preferred zone (which is given by the PHY based index) but also in view of current scheduling constraints at the moment of the transmission of the bursts.

In other words, the general concept of an embodiment of the invention is to propose a dynamic scheduling method to keep all allocation options open as long as possible while maintaining a reasonable complexity level. The scheduling method of an embodiment of the invention evaluates the possibilities to temporarily allocate sufficient slots for every downlink packet in both zones, and defer the actual zone selection decision as long as possible. Thus, the allocation, according to an embodiment of the invention, is made "burst by burst". Thus, when using the method of an embodiment of the invention, it is possible to use the available resources more efficiently, by allocation a burst to a zone even if this zone is not the preferred zone for the mobile station. The FFR improve scheduling method is based on the fact that in general mobile station can receive DL data on the two zones (R1_Zone & R3_Zone) even though that a preferred zone can be assigned for each mobile station. The preferred zone for a specific mobile station is evaluated by maximizing base station efficiency considering the possible MCS and the ratio between the numbers of slots in each zone. E.g. if QPSK ½ is the selected MCS in R1_Zone (1 bit per sub-carrier), and the number of slots in R1 is 3 times more than in R3, then R3_zone is preferable only if it provides an MCS with 3 bit per sub-carrier efficiency (16QAM ¾) and above.

A much better utilization can be achieved by letting the scheduler to decide on which zone to transmit data chunks to every mobile station while taking into consideration not just the recommended MCSs but also the actual available space in each zone. Algorithm's requirements and details are depicted in the following sub-clauses.

Figure 1:
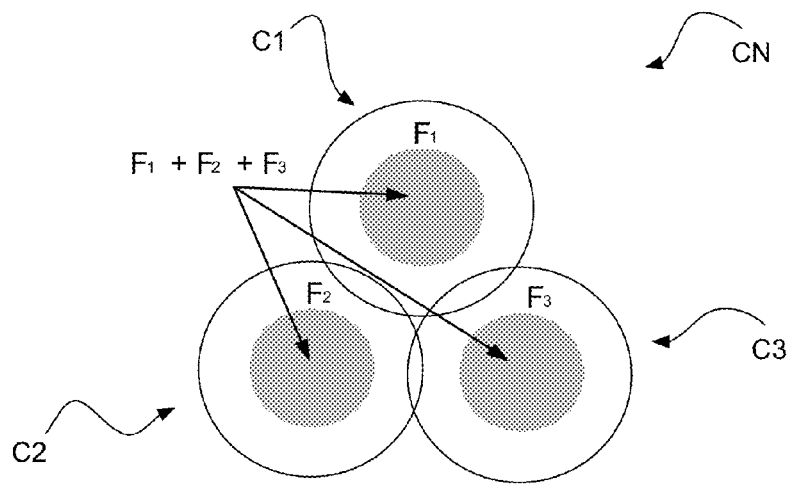
FIG. 1, already commented, represents a cellular network with three cells where FFR is employed.
Figure 2:
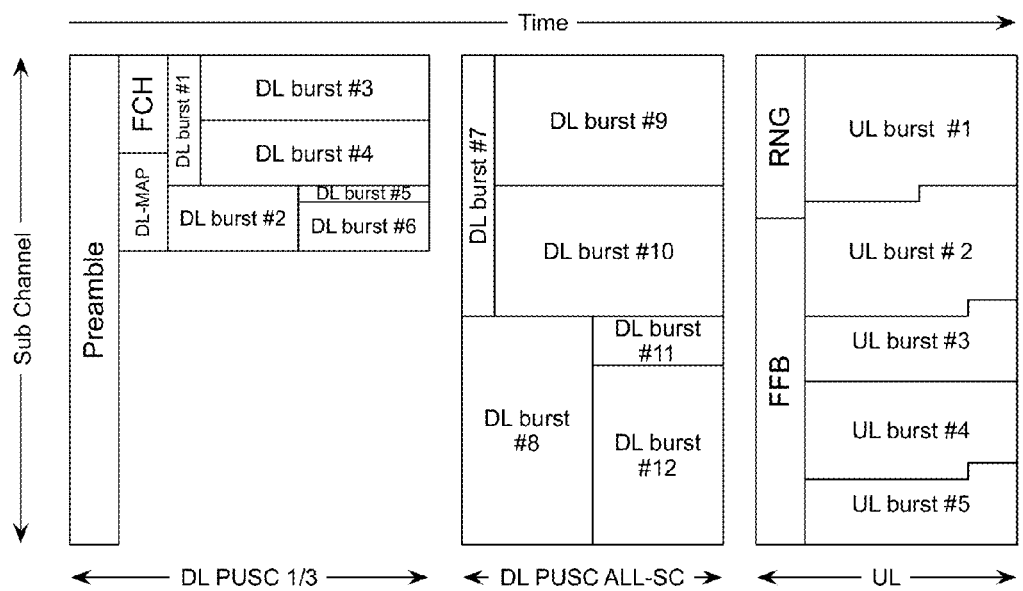
FIG. 2, already commented, shows an example of a WIMAX TDD frame partitioned into zones on the downlink (DL)
Figure 3:
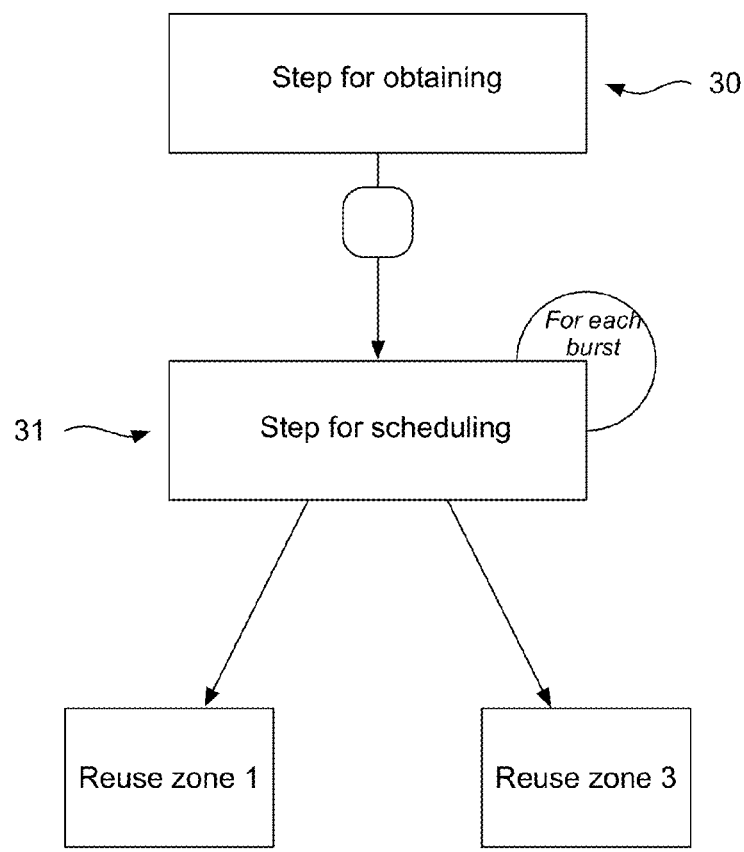
FIG. 3 illustrates the mains steps of the dynamic allocation method.

The main features of an embodiment of the invention are presented in relation with FIG. 3. Firstly, the dynamic scheduling method comprises:

a step for obtaining (30) at least one PHY based index defining a preferred allocation of a mobile station among at least two frequency reuse zone (Zr1, Zr3) in a cell of said communication network;

a step for scheduling (31) bursts of packets to transmit to said mobile station, by means of at least one frequency reuse zone among the at least two frequency reuse zone, in view of transmission requests and said at least one PHY based index.

Thus, the dynamic scheduling method of an embodiment of the invention allows:

achieving maximal cell throughput under restriction of QoS order of protocol data units (PDUs).

keeping the Scheduler intact (manipulation after the QoS scheduler has sent the PDU), and thus making the implementation of an embodiment of the invention easy.

2. Description of a Specific Embodiment 2.1. Calculation of the PHY Based Index for Estimating the Value of Allocating a MS to a Full ($v_{R1}$) or Partial ($v_{R3}$) Reuse Zone 5.2.1.1 Predicting the Modulation and Coding Scheme (MCS) in Both Zones ("Alternate Zone" and "Assigned Zone"):

The decision to select the reuse-1 zone or reuse-3 zone is based on the resource-relative throughput in each zone: the throughput is calculated using the MCS (modulation and coding scheme), and the resources are the number of slots in each zone. The MCS is chosen using the link adaptation mechanism.

The relative throughput (which is MCS*resources) in each zone is used, according to this embodiment, as a measure of performance when assigning a mobile station to a zone. The zone not assigned to the mobile station is referred to as the "alternate zone".

Figure 4:
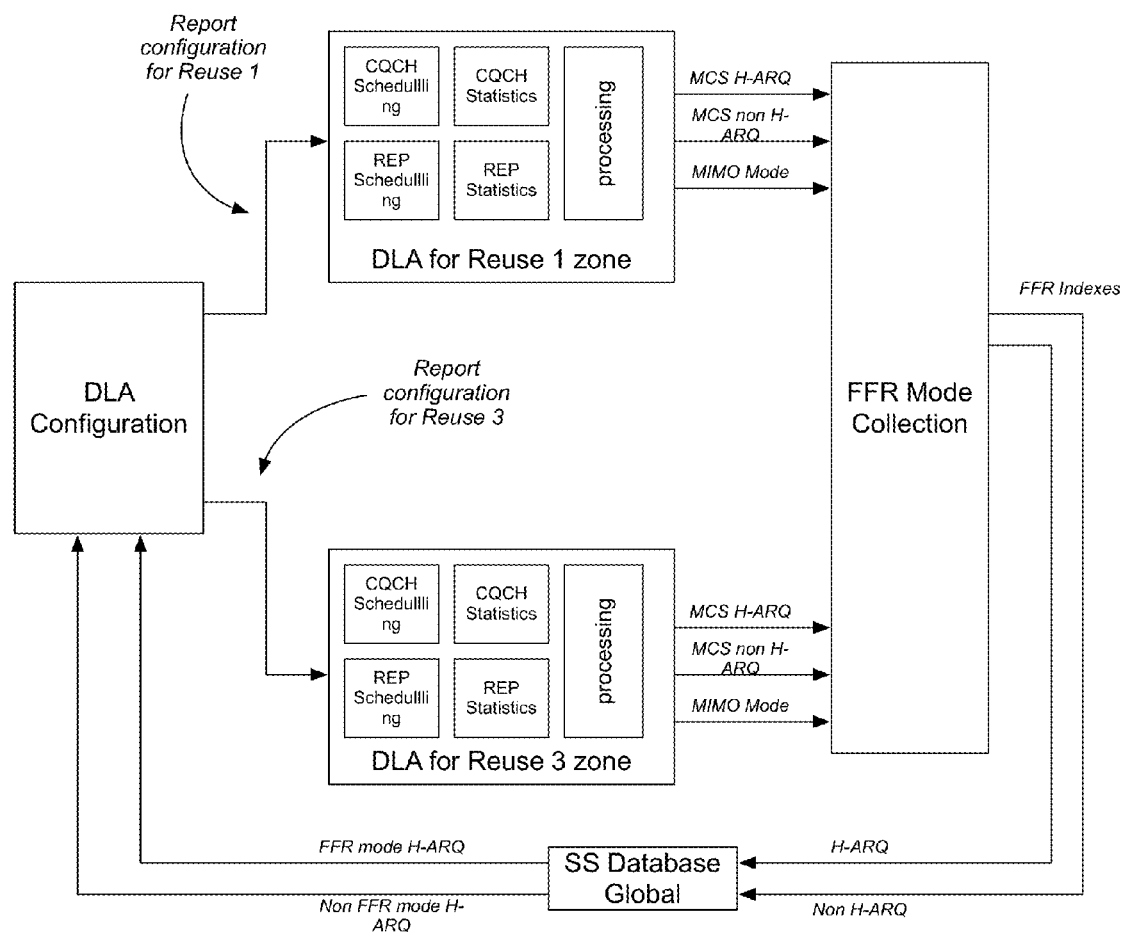
FIG. 4, is a high level block diagram of the proposed Down Link Adaptation (DLA) and FFR mechanism.

FIG. 4 is a high level block diagram of the proposed Down Link Adaptation (DLA) and FFR mechanism. The "DLA for reuse-X zone" blocks cover the scheduling, statistics and DLA processing blocks for the each zone.

The FFR mode collection block accepts the selected MCS from both DLA blocks (reuse-1 and reuse-3) and calculates the "FFR index".

The zone assignment decision is derived from this index.

The "SS Database global" comprises an ordered list, called a Zone Allocation Table.

As it can bee seen in FIG. 4, The DLA (Down Link Adaptation) algorithm, supplies an MCS (Modulation and Coding Scheme) for connections for the mobile station. There are basically two different types of connections for a mobile station, an HARQ connection and a non-HARQ connection. Due to the different characteristics of the HARQ and non-HARQ connections, the DLA supplies different MCS to each type of the connections apart. FIG. 4 shows a DLA block that has three outputs: MCS HARQ, MCS non-HARQ and MIMO mode (applies to all connections). The FFR mode collector block supplies two different FFR_Index (since the FFR_Index is based on MCS, and there are two different sets of MCS for HARQ and non-HARQ connections) for each type of connection—HARQ and non-HARQ. The various FFR indexes are then inserted into the "SS Database global" which is then utilised for selecting the more appropriate frequency reuse zone (reuse-1 and reuse-3) among the available frequency reuse zone.

In other words, on each iteration (i.e. each time a burst has to be sent), an FFR Index is calculated for each of the N different types of connections, each with their own MCS (output of the DLA Reuse X blocks).

5.2.1.2 Calculating the FFR Index:

The "FFR index" is the ratio between the values ($v_{R3}$ and $v_{R1}$) of having a mobile station in either zone. The "FFR index" is expressed by the formula $$\frac{v_{R3}}{v_{R1}}$$

For obtaining the "FFR index" the values $v_{R3}$ and $v_{R1}$ have to be calculated first. For one zone (Reuse 1 zone or Reuse 3 zone), the value $v_R$ is calculated by multiplying the efficiency by the channel resources.

Efficiency (bits/symbol) is derived from the modulation and coding scheme (MCS) (see Table 1 below).

Channel resources are the used subchannels, derived from the Frame Control Header (FCH) major group bit map. In a reuse 1 zone, all the subchannels are used, therefore it is 1. In a reuse 3 zone, the resources are lower than 1, according to the subchannel index (see Table 2 below).

TABLE 1

Efficiency (bits/symbol) per MSC

| MCS | Efficiency |
| --- | --- |
| Outage | 0 |
| QPSK ½ REP6 Matrix A | 0.167 |
| QPSK ½ REP4 Matrix A | 0.25 |
| QPSK ½ REP2 Matrix A | 0.5 |
| QPSK ½ Matrix A | 1 |
| QPSK ¾ Matrix A | 1.5 |
| 16QAM ½ Matrix A | 2 |
| 16QAM ¾ Matrix A | 3 |
| 64QAM ½ Matrix A | 3 |
| 64QAM ⅔ Matrix A | 4 |
| 64QAM ¾ Matrix A | 4.5 |
| 64QAM ⅚ Matrix A | 5 |
| 16QAM ¾ Matrix B | 6 |
| 64QAM ½ Matrix B | 6 |
| 64QAM ⅔ Matrix B | 8 |
| 64QAM ¾ Matrix B | 9 |
| 64QAM ⅚ Matrix B | 10 |

TABLE 2

Resource Fraction per SC Bitmap

| FCH bitmap | Number of SCH |
| --- | --- |
| 100000 | 6/30 in 10 MHz channel |
| 100000 | 5/15 in 5 MHz channel |
| 110000 | 10/30 in 10 MHz channel |
| 110100 | 14/30 in 10 MHz channel |
| 110101 | 18/30 in 10 MHz channel |

As an example, let's assume the MCS for Hybrid Automatic Repeat ReQuest (HARQ) in reuse 1 is 16QAM ½ Matrix A and the MCS for HARQ in reuse 3 is 64QAM 5/6 Matrix A. Assume that the FCH bitmap is '110100' therefore 14/30 subchannels are used. Then the value for reuse-1 ($v_{R1}$) is 2×1=2 and the value for reuse-3 ($v_{R3}$) is $$5 \times \frac{14}{30} \approx 2.3333.$$

In this example, the "FFR index" cost function is thus $$\frac{v_{R3}}{v_{R1}} \approx \frac{2.3333}{2} \approx 1.6667.$$

This index can then be transformed in a most convenient representation, for example in a form of an enumerator which could take a value between 0 and 10, 0 being the lowest "score" and 10 being the highest "score", so as it is more convenient to sort or order.

2.2. Dynamically Allocating Bursts to Reuse-1 and Reuse-3 Zones Depending on MAC Based Statistics for Zone Utilization.

2.2.1 General Concept

The PHY based index (which is for example the "FFR index"), previously calculated, is based on the link quality between the mobile station and the base station, but does not consider the current bandwidth usage in the different zones as a factor in the assignment decision.

Therefore, it is possible the bandwidth utilization may be inefficient: it is possible that one zone ("Reuse-1 for example) shall be full and a mobile station will not be served at all, even if it could have been served in the other zone (Reuse-3 for example or vice-versa).

This limitation can be overcome, according to an embodiment of the invention, by allocating each burst separately, as opposed to assigning a mobile station strictly to one zone (which is done by previous techniques). In other words, the method of an embodiment of the invention is using a PHY index (which is in an embodiment the "FFR index") in conjunction with the scheduling constraints in the different zones (remark: these constraints are related to the available resources for allocation and indeed impose a reduction of capacity. The resources are related to the current number of slots available which are themselves related to the current available bandwidth).

The method of an embodiment of the invention is based on the fact that a mobile station may be served in either the reuse-1 or the reuse-3 zone, even if one of the zones is preferable due to the link quality. Therefore, the scheduler may schedule a burst to a mobile station in either zone, based on two criteria—the load in both zones and the mobile station's "preferred zone".

As already explained, one feature of the method of an embodiment of the invention is to keep all options open as long as possible while maintaining a reasonable level of processing complexity. The scheduling method of an embodiment of the invention evaluates the possibilities to temporarily allocate sufficient slots for every downlink packet in both zones, and defer the actual zone selection decision (the definitive decision of allocation of the mobile station to one of the zones) as long as possible.

When double allocation becomes impossible (due to insufficient free slots in one or both zones), the algorithm frees slots by selecting packets with a double allocation and assigning them to a specific zone. In such a manner, the temporarily allocated slots of the other zone are recycled for usage.

Finally, when all packets have been handled and some packets still have double allocations, they are routed to the appropriate zone based on the mobile station's "preferred zone" (previously referred to as the "assigned zone").

2.2.2 Requirements and Assumptions

The dynamic scheduling method assumes that the following parameters shall be provided by Down Link Adaptation (DLA) algorithm for each active mobile station:

R1-MCS—The preferred DL MCS to be used by this MS when operating in R1_Zone.

R3-MCS—The preferred DL MCS to be used by this MS when operating in R3_Zone.

FFR_Index (which is an Efficiency_Index)—Represents zone selection recommendation. FFR_Index range shall be between 1 and 10. The preferred zone for the higher numbers is R1_Zone and vice versa. This FFR_Index is the one previously calculated (see 5.2.2.2).

According to an embodiment of the invention, the FFR_Index for a mobile station located on the cell edge (and thus can't use R1_Zone at all) is set to null to indicate this situation. On the other hand, the R3-MCS is always defined since any mobile station that operates in R1_Zone can easily operate in R3_Zone (with same or higher MCS).

Another known assumption is the fact that the scheduler must obey to the DL Quality of Service (QoS) considerations. The scheduler receives a request for transmitting a data chunk to a specific CID, verifies if it fits in the upcoming time frame, and once a positive conclusion is reached, reconsideration isn't allowed. Because the scheduler isn't aware of QoS's queues, priorities and fairness considerations, it must accept and preserve the order of the incoming data as dictated by the QoS process.

2.2.3 Top Level Description

The dynamic scheduler, which processes the dynamic scheduling method of an embodiment of the invention, maintains an ordered list having the following structure, called a Zone Allocation Table (ZAT):

| Pointer to appropriate data chunk descriptor | FFR_Index | Required # of slots in R1_Zone | Required # of slots in R3_Zone |
|---|---|---|---|
| | | | |
| | | | |
| | | | |
| | | | |

The scheduler also maintains two variables that contain respectively the number of available slots in each zone (initialized at the beginning to the total number of slots in each zone) denoted by R1_FreeSlots & R3_FreeSlots.

For every incoming request, the scheduler:

1. Calculates the number of slots that are needed to fulfill the request in both zones, using the appropriate MCS in each zone. A null value shall clearly indicate the case in which R1_Zone isn't acceptable for this MS.
2. When the needed number of slots (from step #1 above) in each zone is less than the remaining number in that zone (R1_FreeSlots & R3_FreeSlots), the request shall be inserted in the Zones Allocation Table in its proper location (ordered by its FFR_Index) and the remaining number of slots per zone shall be updated.
3. If the conditions are less favorable than those described in step #2 above, the scheduler shall try to free sufficient number of slots for the new requested packet in the following manner:

In order to free slots from R1_Zone it shall scan the ordered list in an ascending order (bottom to top). During this scanning, entries that have a double zone allocation shall free their R1_Zone slots allocation updating the R1_FreeSlots variable. The scanning continues as long as the number of free slots isn't sufficient (is still below the request newly number) and the efficiency index of the entries is below FFR_index of the new request.

In order to free slots from R3_Zone it shall scan the ordered list in a descending order (top to bottom) as long as the efficiency index of the entries is above FFR_index of the new request. The scanning continues as long as the number of free slots isn't sufficient (is still below the request newly number) and the efficiency index of the entries is above FFR_index of the new request.

2.2.4 HARQ/Non-HARQ Specific Embodiment.

Figure 5:
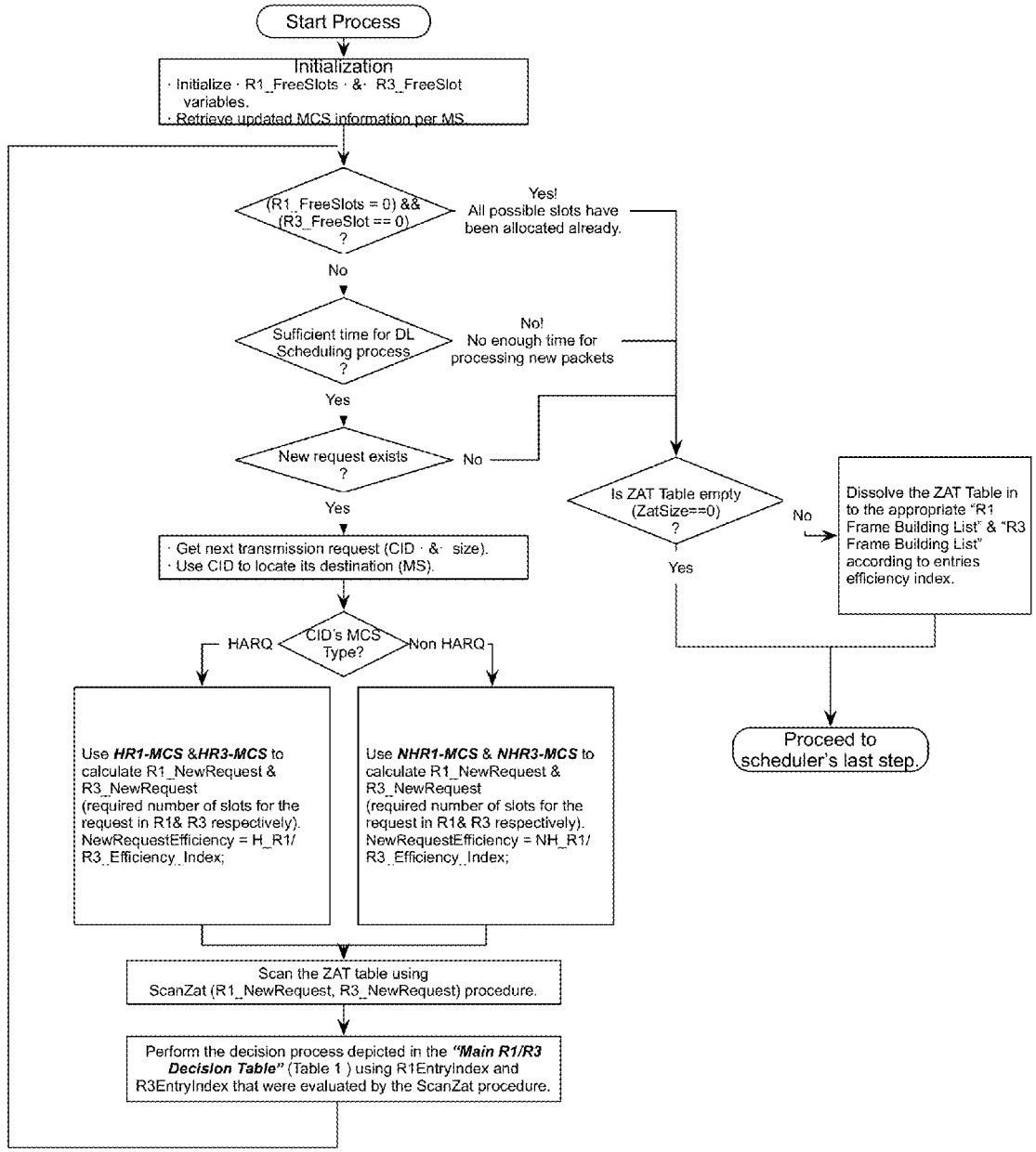
FIG. 5 illustrates the steps of the dynamic allocation method in the architecture previously described in FIG. 4.

A specific embodiment of the method (which takes into account both HARQ and non-HARQ MCS) is detailed in FIG. 5, in conjunction with the architecture of FIG. 4.

In This embodiment, the FFR Scheduling method assumes that the following parameters shall be provided by DLA algorithm for each active mobile station (These parameters are undoubtedly dynamically updated according to the reported CINR):

HR1-MCS—The preferred DL MCS to be used by the HARQ CIDs of this mobile station when operating in R1_Zone.

NHR1-MCS—The preferred DL MCS to be used by the Non HARQ CIDs of this mobile station when operating in R1_Zone.

HR3-MCS—The preferred DL MCS to be used by the HARQ CIDs of this mobile station when operating in R3_Zone.

NHR3-MCS—The preferred DL MCS to be used by the Non HARQ CIDs of this mobile station when operating in R3_Zone.

H_R1/R3_Efficiency_Index—An enumerator that represents DLA's zone selection recommendation for HARQ modulation. The enumerator range shall be between 1 and 10. The preferred zone for the higher numbers is R1_Zone and vise versa.

NH_R1/R3_Efficiency_Index—An enumerator that represents DLA's zone selection recommendation for Non HARQ modulation. Same range and interpretation as above.

It is quite clear the HR1-MCS & NHR1-MCS for a mobile station located on the cell edge (and thus can't use R1_Zone at all) should be set to null to clearly indicate this situation. On the other hand, it is also clear that HR3-MCS & NHR3-MCS are always defined since any mobile station that operates in R1_Zone can easily operate in R3_Zone (with same or higher MCS).

A specific procedure is described in Annex. The content of this annex is a full part of the patent application.

2.2.5 Description of an Apparatus.

Figure 6:
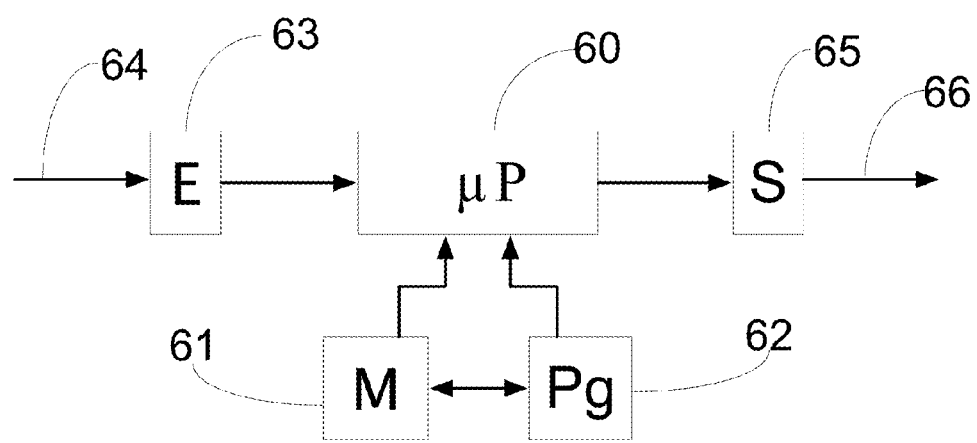
FIG. 6 illustrates a structure of an apparatus for execution of the dynamic allocation method.

The structure of an apparatus for the execution of the presented method is illustrated schematically in FIG. 6. It comprises a memory M 61, and a processing unit 60 equipped with a microprocessor IR, that is driven by a computer program (or application) Pg 62. At input, the processing unit 60 receives signal 64 through a network input interface module E 63. The microprocessor μP processes signal 64 according to the instructions of the program Pg 62, to choose the reuse zone adapted to the burst 66 which will be transmitted through an interface module S 65.

3. Annex

| Zone Allocation Table (ZAT) Handling Routines | |
|---|---|
| Let: | |
| ZatSize | Total number of entries in the ZAT table |
| j | Entry index in the ZAT table. j is in the range of 0 ÷ (ZatSize − 1) |
| Zat[j].Efficiency | Indicate the R1/R3_Efficiency_Index of entry j |
| Zat[j].R1NumOfSlots | Indicate the required number of slots in R1 zone of entry j |
| Zat[j].R3NumOfSlots | Indicate the required number of slots in R3 zone of entry j |
| Zat.TotalR1NumOfSlots | Sum of the number of slots of all the entries in R1 zone in ZAT |
| Zat.TotalR3NumOfSlots | Sum of the number of slots of all the entries in R3 zone in ZAT |
| R1_FreeSlots | Unallocated slots in R1 zone |
| R3_FreeSlots | Unallocated slots in R3 zone |
| R1NumOfSlots | Total number of slots in R1 zone |
| R3NumOfSlots | Total number of slots in R3 zone |
| R1_NewRequest | Required number of slots in R1 zone that satisfies the new incoming packet. If the specific request belongs to an MS that is located at the cell edge and thus can't use R1, this value shall be set to a very large number; e.g. 216 x R1NumOfSlots. |
| R3_NewRequest | Required number of slots in R3 zone that satisfies the new incoming packet. |

The following procedure, denoted ScanZat, scans the ZAT table twice. Initially from top to bottom (ascending indexes) for R3 zone allocation, and then from bottom to top (descending indexes) for R1 zone allocation. The outputs, denoted by R1EntryIndex & R3EntryIndex, are the indexes of the last entries that must be released (up to and including these entries) from the ZAT table in order to satisfy the new request.

A value of −1 in each respective index indicates that there are sufficient free slots to satisfy the request without releasing entries from the ZAT table. A value of "NoRoom" in each respective index indicates that the request can't be fulfilled at all, i.e. the sum of the free slots plus the slots in the particular column (of the ZAT table) can't satisfy the new request in that particular zone.

```
ScanZat    (R1_NewRequest, R3_NewRequest)
{
/*     Scan R3 column.
If    (R3_NewRequest <= (R3_FreeSlots + Zat.TotalR3NumOfSlots))
{
TempR3Slots = R3_FreeSlots;
j = −1;
While (R3_NewRequest > TempR3Slots)
{
j = j+1;
TempR3Slots = TempR3Slots + Zat[j].R3NumOfSlots;
}
R3EntryIndex = j;
}
Else    R3EntryIndex = NoRoom;    /* There aren't sufficient slots
                                     in R3
                                     zone to satisfy the new request.
/*     Scan R1 column.
If    (R1_NewRequest <= (R1_FreeSlots + Zat.TotalR1NumOfSlots))
{
TempR1Slots = R1_FreeSlots;
j = −1;
While (R1_NewRequest > TempR1Slots)
{
j = j+1;
TempR1Slots = TempR1Slots + Zat[ZatSize−1−j].R1NumOfSlots;
}
If    (j = −1)    R1EntryIndex = j;
Else   R1EntryIndex = ZatSize−1−j;
}
Else    R1EntryIndex = NoRoom;    /* There aren't sufficient slots
                                     in R1
                                     zone to satisfy the new request.
Return      R1EntryIndex, R3EntryIndex
}
```

TABLE 3

Main R1/R3 Decision Table

| | R1EntryIndex = NoRoom | R1EntryIndex = −1 | R1EntryIndex >= 0 |
|---|---|---|---|
| R3EntryIndex | Simple allocation isn't possible, thus:<br>If (Fragmentation of the newly requested packet is allowed)<br>{<br>   SelectZone&FragmentedPacket;<br>}<br>Else<br>   Reject the packet; | R3 allocation isn't possible (insufficient number of slots). Nevertheless R1 allocation is possible with no need to release existing entries from the ZAT table.<br>Send the new packet to "R1 Frame Building List".<br>Subtract R1_NewRequest from R1_FreeSlots. | R3 allocation isn't possible. However, R1 allocation is possible but this allocation requires releasing existing entries from the ZAT table starting from the bottom upwards up to and including R1EntryIndex, and is performed by:<br>MakeRoomR1 (R1EntryIndex);<br>Send the new packet to "R1 Frame Building List" and subtract R1_NewRequest from R1_FreeSlots. |
| R3EntryIndex = −1 | R1 allocation isn't possible (insufficient number of slots). Nevertheless R3 allocation is possible with no need to release existing entries from the ZAT table.<br>Send the new packet to "R3 Frame Building List".<br>Subtract R3_NewRequest from R3_FreeSlots. | Both R1 & R3 allocations are possible without the need to release existing entries from the ZAT table.<br>InsertNewEntryInZatTable; | If (Zat[R1EntryIndex].Efficiency < NewRequestEfficiency)<br>{<br>   MakeRoomR1 (R1EntryIndex);<br>   InsertNewEntryInZatTable;<br>}<br>Else<br>{<br>   Send the new packet to "R3 Frame Building List".<br>   Subtract R3_NewRequest from R3_FreeSlots.<br>} |

TABLE 3-continued

Main R1/R3 Decision Table

| | R1EntryIndex = NoRoom | R1EntryIndex = −1 | R1EntryIndex >= 0 |
|---|---|---|---|
| R3EntryIndex >= 0 | R1 allocation isn't possible. However, R3 allocation is possible but this allocation requires releasing existing entries from the ZAT table starting from the top downwards up to and including R3EntryIndex, and is performed by: MakeRoomR3 (R3EntryIndex); Send the new packet to "R3 Frame Building List" and subtract R3__NewRequest from R3__FreeSlots. | If (Zat[R3EntryIndex].Efficiency > NewRequestEfficiency) {     MakeRoomR3 (R3EntryIndex);     InsertNewEntryInZatTable; } Else {     Send the new packet to     "R1 Frame Building List".     Subtract R1__NewRequest from     R1__FreeSlots. } | Four different possibilities depending on the relations between: NewRequestEfficiency, Zat[R1EntryIndex].Efficiency, and Zat[R3EntryIndex].Efficiency. See details in Table 4 bellow. |

TABLE 4

Internal R1/R3 Decision Table

| | Zat[R1EntryIndex].Efficiency < NewRequestEfficiency | Zat[R1EntryIndex].Efficiency >= NewRequestEfficiency |
|---|---|---|
| Zat[R3EntryIndex].Efficiency > NewRequestEfficiency | MakeRoomR1 (R1EntryIndex); MakeRoomR3 (R3EntryIndex); InsertNewEntryInZatTable; | MakeRoomR3 (R3EntryIndex); Send the new packet to "R3 Frame Building List". Subtract R3__NewRequest from R3__FreeSlots. If (NewRequestEfficiency > Efficiency Threshold) {     MakeRoomR1 (R1EntryIndex);     Send the new packet to "R1 Frame Building     List".     Subtract R1__NewRequest from R1__FreeSlots. } Else {     MakeRoomR3 (R3EntryIndex);     Send the new packet to "R3 Frame Building     List".     Subtract R3__NewRequest from R3__FreeSlots. } |
| Zat[R3EntryIndex].Efficiency <= NewRequestEfficiency | MakeRoomR1 (R1EntryIndex); Send the new packet to "R1 Frame Building List". Subtract R1__NewRequest from R1__FreeSlots. | |

```
InsertNewEntryInZatTable   (R1__NewRequest,   R3__NewRequest,
        NewRequestEfficiency)
{
    Use NewRequestEfficiency to locate the proper place for the new
    entry;
    Insert the new entry in its proper place;
    R1__FreeSlots = R1__FreeSlots − R1__NewRequest;
    Zat.TotalR1NumOfSlots = Zat.TotalR1NumOfSlots +
    R1__NewRequest;
    R3__FreeSlots = R3__FreeSlots − R3__NewRequest;
    Zat.TotalR3NumOfSlots = Zat.TotalR3NumOfSlots +
    R3__NewRequest;
    ZatSize ++;
}
SelectZone&FragmentedPacket   (R1__NewRequest,
R3__NewRequest)
{        /* Select R1 Zone for the fragmented packet if
         its available slots can accommodate a larger
         chunk of data (more bytes) in comparison to R3
         zone. Otherwise, select R3 zone for the
         fragmented packet.
If((R1__FreeSlots   +   Zat.TotalR1NumOfSlots)*R3__NewRequest
>
         (R3__FreeSlots
         Zat.TotalR3NumOfSlots)*R1__NewRequest)
{
    MakeRoomR1 (0);       /* Transfer all the entries from the ZAT
    to R3 zone and update the appropriate variables.
    R1__NewRequest = R1__FreeSlots; /* Fragment can use only
    remaining
    number of slots in R1.
```

```
    R1__FreeSlots = 0;
    FragmentedPacketIndication = True;
    Send new request to "R1 Frame Building List";
}
Else
{
    MakeRoomR3 (ZatSize−1); /* Transfer all the entries from the ZAT
    to R1 zone and update the appropriate variables.
    R3__NewRequest = R3__FreeSlots; /* Fragment can use only
    remaining number of slots in R3.
    R3__FreeSlots = 0;
    FragmentedPacketIndication = True;
    Send new request to "R3 Frame Building List";
}
}
MakeRoomR1   (R1EntryIndex)
{ /* The MakeRoomR1 process includes sending each of the released
         entries to "R3 Frame Building List" and
         properly   updating:   R1__FreeSlots,
         Zat.TotalR1NumOfSlots,               and
         Zat.TotalR3NumOfSlots.
    j = ZatSize−1;
    While (j >= R1EntryIndex)
    {
        R1__FreeSlots = R1__FreeSlots + Zat[j].R1NumOfSlots;
        Zat.TotalR1NumOfSlots    =    Zat.TotalR1NumOfSlots    −
        Zat[j].R1NumOfSlots;
        Zat.TotalR3NumOfSlots    =    Zat.TotalR3NumOfSlots    −
        Zat[j].R3NumOfSlots;
        Remove j entry from ZAT table;
```

-continued

```
    Transfer j entry to "R3 Frame Building List";
    j --;
  }
}
MakeRoomR3  (R3EntryIndex)
            {/* The MakeRoomR3 process includes sending each
            of the released entries to "R1 Frame Building
            List" and properly updating: R3_FreeSlots,
            Zat.TotalR1NumOfSlots,                      and
            Zat.TotalR3NumOfSlots.
j = 0;
While (j <= R3EntryIndex)
{
    R3_FreeSlots = R3_FreeSlots + Zat[j].R3NumOfSlots;
    Zat.TotalR1NumOfSlots    =    Zat.TotalR1NumOfSlots    -
    Zat[j].R1NumOfSlots;
    Zat.TotalR3NumOfSlots    =    Zat.TotalR3NumOfSlots    -
    Zat[j].R3NumOfSlots;
    Remove j entry from ZAT table;
    Transfer j entry to "R1 Frame Building List";
    j ++;
}
}
```

Although the present disclosure has been described with reference to one or more examples, workers skilled in the art will recognize that changes may be made in form and detail without departing from the scope of the disclosure and/or the appended claims.

The invention claimed is:

1. A dynamic packet scheduling method in a cellular Orthogonal Frequency-Division Multiple Access—Time-Division Duplexing (OFDMA-TDD) network, wherein said dynamic packet scheduling method comprises the following steps:
   obtaining at least one physical layer (PHY) based index defining a preferred allocation of a mobile station among at least two frequency reuse zones in a cell of said (OFDMA-TDD) network;
   scheduling bursts of packets to transmit to said mobile station, by at least one frequency reuse zone among the at least two frequency reuse zones, in view of transmission requests and said at least one PHY based index; and
   transmitting the bursts of packets based on the scheduling.

2. The dynamic packet scheduling method according to claim 1 wherein said scheduling step comprises, for every incoming transmission request:
   a step of calculating a number of slots that are needed to fulfil said incoming transmission request in said at least two frequency reuse zones, using an appropriate modulation and coding scheme in each of said frequency reuse zones;
   a step of inserting at least one parameter of said incoming transmission request in a zone allocation data structure, when said needed number of slots in each of said frequency reuse zones is less than a remaining number of slots in that said frequency reuse zone; and
   a step of freeing at least one slot in at least one of said frequency reuse zones, when said needed number of slots in one of said frequency reuse zones is greater than the remaining number of slots in that said frequency reuse zone.

3. The dynamic packet scheduling method according to claim 2, wherein said zone allocation data structure comprises, for a current incoming transmission request:
   a field that points to an appropriate data chunk descriptor associated to said current incoming transmission request;
   a field, comprising said PHY based index, that represents frequency reuse zone selection recommendation;
   a field comprising a number of required slots in a first of said at least two frequency reuse zones;
   a field comprising a number of required slots in a second of said at least two frequency reuse zones.

4. The dynamic packet scheduling method according to claim 3, wherein said step of freeing at least one slot comprises, when said slots have to be freed in said first frequency reuse zone:
   at least one step of freeing, in said zone allocation data structure, from a lowest value of said PHY based index to a highest value of said PHY based index, entries of said zone allocation data structure that have a double frequency reuse zone allocation;
   at least one step of updating said remaining number of slots in said first frequency reuse zone.

5. The dynamic packet scheduling method according to claim 3, wherein said step of freeing at least one slot comprises, when said slots have to be freed in said second reuse zone:
   at least one step of freeing, in said zone allocation data structure, from the highest value of said PHY based index to the lowest value of said PHY based index, entries of said zone allocation data structure that have a double frequency reuse zone allocation;
   at least one step of updating said remaining number of slots in said second reuse zone.

6. The dynamic packet scheduling method according to claim 1, wherein said step of obtaining at least one PHY based index comprises a step of calculating a ratio between a first value of allocating said mobile station to a first of said at least two frequency reuse zones and a second value of allocating said mobile station to a second of said at least two frequency reuse zones.

7. The dynamic packet scheduling method according to claim 6, wherein said first value of allocating said mobile station to the first of said at least two frequency zones is obtained by multiplying efficiency (bits/symbol), by channel resources both applied to a first of said at least two frequency reuse zones.

8. The dynamic packet scheduling method according to claim 6, wherein said second value of allocating said mobile station to the second of said at least two frequency zones is obtained by multiplying efficiency (bits/symbol), by channel resources both applied to a second of said at least two frequency reuse zones.

9. A dynamic packet scheduling apparatus in a cellular Orthogonal Frequency-Division Multiple Access—Time-Division Duplexing (OFDMA-TDD) network wherein the apparatus comprises:
   a processor for:
   obtaining at least one physical layer (PHY) based index defining a preferred allocation of a mobile station among at least two frequency reuse zones in a cell of said (OFDMA-TDD) network;
   scheduling bursts of packets to transmit to said mobile station, by at least one frequency reuse zone among the at least two frequency reuse zones, in view of transmission requests and said at least one PHY based index; and
   transmitting the bursts of packets based on the scheduling.

10. A computer program product stored on a non-transitory computer-readable medium and executable by a microprocessor, said computer program product comprising program code instructions for:
   obtaining at least one physical layer (PHY) based index defining a preferred allocation of a mobile station among at least two frequency reuse zones in a cell of a cellular Orthogonal Frequency-Division Multiple Access—Time-Division Duplexing (OFDMA-TDD) network;

scheduling bursts of packets to transmit to said mobile station, by at least one frequency reuse zone among the at least two frequency reuse zones, in view of transmission requests and said at least one PHY based index;

transmitting the bursts of packets based on the scheduling.

* * * * *